(12) United States Patent
Schmitz et al.

(10) Patent No.: US 9,505,895 B2
(45) Date of Patent: Nov. 29, 2016

(54) AMINES SUITABLE FOR USE IN THE MANUFACTURE OF POLYURETHANES

(71) Applicant: EVONIK DEGUSSA GMBH, Essen (DE)

(72) Inventors: Sarah Schmitz, Duisburg (DE); Martin Glos, Borken (DE); Roland Hubel, Essen (DE); Annegret Terheiden, Alpen (DE)

(73) Assignee: EVONIK DEGUSSA GMBH, Essen (DE)

( * ) Notice: Subject to any disclaimer, the term of this patent is extended or adjusted under 35 U.S.C. 154(b) by 0 days.

(21) Appl. No.: 14/766,015

(22) PCT Filed: Jan. 7, 2014

(86) PCT No.: PCT/EP2014/050123
§ 371 (c)(1),
(2) Date: Aug. 5, 2015

(87) PCT Pub. No.: WO2014/121959
PCT Pub. Date: Aug. 14, 2014

(65) Prior Publication Data
US 2015/0368420 A1    Dec. 24, 2015

(30) Foreign Application Priority Data
Feb. 5, 2013 (DE) .......... 10 2013 201 829

(51) Int. Cl.
*C09J 9/00* (2006.01)
*C08J 9/00* (2006.01)
(Continued)

(52) U.S. Cl.
CPC ............. *C08J 9/00* (2013.01); *C08G 18/2081* (2013.01); *C08G 18/285* (2013.01); *C08G 18/3203* (2013.01); *C08G 18/48* (2013.01); *C08G 18/72* (2013.01); *C08G 18/7664* (2013.01);
(Continued)

(58) Field of Classification Search
None
See application file for complete search history.

(56) References Cited

U.S. PATENT DOCUMENTS 2,834,748 A    5/1958  Bailey et al.
2,917,480 A    12/1959 Bailey et al.
(Continued)

FOREIGN PATENT DOCUMENTS

DE    2533074      3/1976
DE    4229402 A1   3/1994
(Continued)

OTHER PUBLICATIONS

Alcock, N.W., et al. "Studies of Pendant-arm Macrocyclic Ligands. Part 5. Synthesis of Two Pyridine-containing Penta-aza Macrocycles with Single Pyrrolidinyl Pendant Arms and Characterisation of their Nickel(II) and Copper(II) Complexes. Crystal Structure of Perchlorato{7-[2' -(1" -pyrrolidinyl)ethyl]-3, 7,11,17-tetraazabicyclo [11 .3.1 ] heptadeca-1 (17),13, 15-triene)nickel(II) Perchlorate", J. Chem. Soc. Dalton Trans. 1987, pp. 545-550.
(Continued)

*Primary Examiner* — Robert S Loewe
(74) *Attorney, Agent, or Firm* — Scully, Scott, Murphy & Presser, P.C.

(57) ABSTRACT

The present invention relates to the use of nitrogenous compounds of formula (I) or of corresponding quaternized, or protonated compounds, for producing polyurethanes, to compositions containing these compounds and also to polyurethane systems obtained using the compounds.

16 Claims, 1 Drawing Sheet

Figure 1:
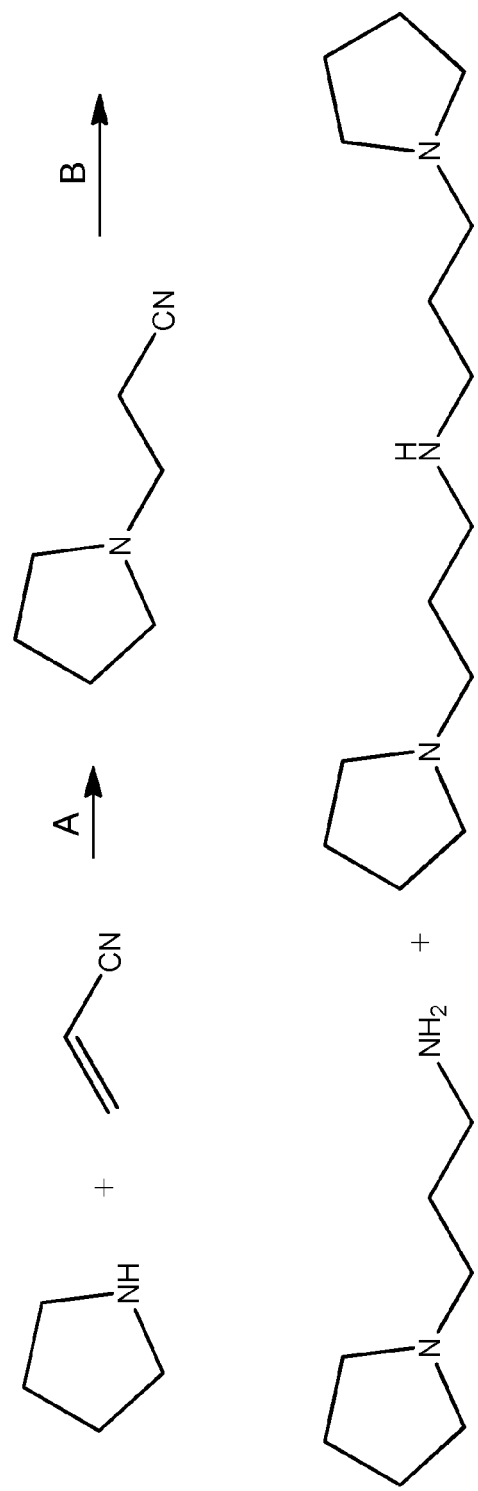

(51) Int. Cl.

| | |
|---|---|
| C08G 18/76 | (2006.01) |
| C08G 18/20 | (2006.01) |
| C08G 18/28 | (2006.01) |
| C08G 18/48 | (2006.01) |
| C08G 18/32 | (2006.01) |
| C08G 18/72 | (2006.01) |
| C08G 101/00 | (2006.01) |

(52) U.S. Cl.
CPC ........... C08G2101/0008 (2013.01); C08G 2101/0025 (2013.01); C08J 2205/06 (2013.01); C08J 2205/10 (2013.01); C08J 2375/08 (2013.01)

(56) References Cited

U.S. PATENT DOCUMENTS

| | | | |
|---|---|---|---|
| 3,629,308 A | 12/1971 | Bailey et al. | |
| 3,933,695 A | 1/1976 | Omietanski et al. | |
| 4,042,540 A | 8/1977 | Lammerting et al. | |
| 4,147,847 A | 4/1979 | Schweiger | |
| 4,855,379 A | 8/1989 | Budnik et al. | |
| 5,306,737 A | 4/1994 | Burkhart et al. | |
| 5,321,051 A | 6/1994 | Burkhart et al. | |
| 5,349,063 A | 9/1994 | Joshua et al. | |
| 5,478,494 A | 12/1995 | Lee et al. | |
| 6,248,801 B1 * | 6/2001 | Meier ............... | C08G 18/08 521/128 |
| 6,359,022 B1 | 3/2002 | Hickey et al. | |
| 7,838,566 B2 | 11/2010 | Glos et al. | |
| 8,735,458 B2 | 5/2014 | Glos et al. | |
| 8,906,974 B2 | 12/2014 | Glos et al. | |
| 8,946,310 B2 | 2/2015 | Glos et al. | |
| 2002/0103091 A1 | 8/2002 | Kodali | |
| 2005/0059749 A1 | 3/2005 | Chaffanjon et al. | |
| 2005/0176837 A1 | 8/2005 | Eilbracht et al. | |
| 2007/0072951 A1 | 3/2007 | Bender et al. | |
| 2007/0238800 A1 | 10/2007 | Neal et al. | |
| 2007/0282026 A1 | 12/2007 | Grigsby Jr. et al. | |
| 2008/0234402 A1 | 9/2008 | Lehmann et al. | |
| 2009/0088489 A1 | 4/2009 | Terheiden et al. | |
| 2011/0015290 A1 | 1/2011 | Schmitz et al. | |
| 2011/0306694 A1 | 12/2011 | Glos et al. | |
| 2012/0264843 A1 | 10/2012 | Glos | |
| 2013/0190414 A1 | 7/2013 | Terheiden et al. | |
| 2014/0058004 A1 | 2/2014 | Schmitz et al. | |
| 2015/0031781 A1 | 1/2015 | Landers et al. | |
| 2015/0057384 A1 | 2/2015 | Glos et al. | |

FOREIGN PATENT DOCUMENTS

| | | |
|---|---|---|
| DE | 4239054 A1 | 5/1994 |
| DE | 19930098 A1 | 11/2001 |
| DE | 102004001408 A1 | 7/2005 |
| DE | 102007046860 A1 | 4/2009 |
| EP | 0493836 A1 | 7/1992 |
| EP | 0495249 A1 | 7/1992 |
| EP | 0533202 A1 | 3/1993 |
| EP | 0656382 A1 | 6/1995 |
| EP | 0780414 A2 | 6/1997 |
| EP | 0839852 A2 | 5/1998 |
| EP | 0867465 A1 | 9/1998 |
| EP | 1038896 A2 | 9/2000 |
| EP | 1161474 | 12/2001 |
| EP | 1299445 | 4/2003 |
| EP | 1435365 A2 | 7/2004 |
| EP | 1457507 A2 | 9/2004 |
| EP | 1537159 | 6/2005 |
| EP | 1544235 A1 | 6/2005 |
| EP | 1678232 | 7/2006 |
| EP | 1712578 A1 | 10/2006 |
| EP | 1977825 A1 | 10/2008 |
| EP | 1977826 A1 | 10/2008 |
| EP | 1985642 A1 | 10/2008 |
| EP | 1985644 A1 | 10/2008 |
| WO | WO 96/12759 A2 | 5/1996 |
| WO | WO 00/47647 A1 | 8/2000 |
| WO | WO 00/58383 A1 | 10/2000 |
| WO | WO 02/04537 A1 | 1/2002 |
| WO | WO 2004/020497 A1 | 3/2004 |
| WO | WO 2004/096882 A1 | 11/2004 |
| WO | WO 2005/033167 A2 | 4/2005 |
| WO | WO 2005/085310 A2 | 9/2005 |
| WO | 2005118668 A1 | 12/2005 |
| WO | WO 2006/094227 A2 | 9/2006 |
| WO | WO 2006/116456 A1 | 11/2006 |
| WO | WO 2007/111828 A2 | 10/2007 |
| WO | WO 2012/072441 | 6/2012 |

OTHER PUBLICATIONS

Katritzky, A.R., et al. "Additions of I-(alpha-Aminoalkyl)benzotriazoles to N-Vinylamines and N-Vinylamides. A Novel and Versatile Method for the Preparation of Unsymmetrically Substituted 1,3-Diamines", J. Org. Chem, 1994, vol. 59, pp. 5206-5214.

International Search Report and Written Opinion dated Jan. 7, 2014 issued in PCT/EP2014/050123.

* cited by examiner

AMINES SUITABLE FOR USE IN THE MANUFACTURE OF POLYURETHANES

The present invention relates to the use of nitrogenous compounds of formula (I) or of corresponding quaternized, or protonated compounds, for producing polyurethanes, to compositions containing these compounds and also to polyurethane systems obtained using the compounds.

PRIOR ART

The use of tertiary amines in the manufacture of polyurethanes is known. A multiplicity of structurally different amines are employed therein as catalysts.

Polyurethanes for the purposes of the present invention are any reaction products between isocyanates and correspondingly isocyanate-reactive molecules. This also comprehends polyisocyanurates, polyureas, allophanates, biurets, etc. The use of tertiary amines in the manufacture of polyisocyanate polyaddition products is preferred.

Tertiary amines are particularly important in the manufacture of polyurethane (PU) foams, since a delicate balance has to be achieved between the "blowing" reaction (water reacts with isocyanate to form carbon dioxide as blowing gas) and the "gelling" reaction (polyols react with isocyanates to form urethanes, which leads to an increase in the molar mass and corresponding gelation) if a high-quality foam is to be obtained.

One major issue identified in the literature is the occurrence of emissions including catalysis-based emissions from the final PU foam.

As a possible solution to the problem of reducing amine emissions from PU foams, EP 1977826 describes the use of N,N,N'-trimethylbis(aminoethyl) ether derivatives as catalysts in polyurethane foam production. These compounds are prepared by reaction of glycidyl ethers and glycidyl esters with ether compounds comprising N,N,N'-trimethylbis(aminoethyl) ether, N,N,N'-trimethylbis(aminoethyl) ether and derivatives thereof.

US 2005/0059749 describes propionamides prepared by reaction (Michael addition) of bis(dimethylaminopropyl) amine with acrylamide derivatives and used as low-emission catalysts for producing PU foams.

EP 1038896 describes propionamides prepared by reaction (Michael addition) of dimethylaminopropylamine with acrylamide derivatives and used as low-emission catalysts for producing PU foams.

EP 1299445 describes polyisocyanate addition product preparation catalysts which, in addition to a tertiary amine functionality, contain a group which, after hydrolysis, complexes or protonates the amine. The catalysts in question are in effect Michael addition products of secondary amines, optionally bearing OH groups, onto unsaturated carboxylic esters, wherein the ester units can then hydrolyse.

WO 2012072441 describes novel low-emission catalysts based on structures containing dialkylaminoalkoxyalkyl and NH functionalities.

DE 102007046860 describes amine-based catalysts which reduce the emissions of dimethylformamide (DMF) and diminish the tendency to recatalyse. However, the catalyst described therein has to be used in relatively high concentrations in order that sufficiently rapid foaming may be achieved.

U.S. Pat. No. 5,478,494 describes a process for producing PU foams by using tertiary amines such as, for example, piperazines and imidazoles as catalytically active substances.

EP 1457507 describes the use of hydroxyl-containing tertiary amines prepared by addition of glycidyl ether onto a secondary amine functionality. N-Methylpyrrolidines are described as useful starting materials, for example.

EP 1435365 describes the use of tertiary amine-amide catalysts prepared by reacting organic acids onto a secondary amine functionality. N-Methylpyrrolidines are an example of amines described as a useful starting material.

Preparation of the amines mentioned is costly and inconvenient in some cases, while there continues to be a need for further alternative amines useful for producing polyurethanes and PU foams having low amine or other emissions in order that catalysts may be provided which promote either blowing or gelling.

The problem addressed by the present invention was that of providing an alternative catalyst for producing polyurethane foams.

It was found that, surprisingly, compounds of formula (I) hereinbelow, or the corresponding quaternized or protonated compounds, solve the problem.

The present invention accordingly provides for the use of compounds of formula (I) or of corresponding quaternized or protonated compounds in the manufacture of polyurethanes and PU foams and also appropriate compositions including the compounds of formula (I) or the corresponding quaternized or protonated compounds.

The use of compounds of formula (I), or of the corresponding quaternized or protonated compounds, which is provided by the present invention leads to a reduction in or prevention of catalysis-based emissions. More particularly, diaminobicyclooctane (TA 33), one of the most important catalysts in flexible PU foaming, can be replaced by a cat which delivers a similar rise profile without emissions.

The compounds of formula (I) used according to the present invention, or the corresponding quaternized or protonated compounds, can catalyse the gelling reaction as well as the blowing reaction in the foaming process and so make it possible to reduce the use levels of a customary gelling catalyst such as tin(II) ethylhexanoate for example.

A further advantage is that the compounds of formula (I) which are used according to the present invention, or the corresponding quaternized or protonated compounds, are free from dimethylamino groups, so an emission of dimethylformamide (DMF) due to amine catalyst can be avoided.

The foams obtained according to the present invention preferably have DMF emissions of not less than 0 $\mu g/m^3$ and not more than 5 $\mu g/m^3$, preferably below 1 $\mu g/m^3$ and more preferably below 0.1 $\mu g/m^3$, as determined by the DIN 13419-1 test chamber method, 24 hours after test chamber loading.

The subjects of the present invention are hereinbelow described by way of example without the invention being supposedly restricted to these exemplary embodiments. Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds. The content of documents cited in the present description shall fully form part of the disclosure content of the present invention, in particular as regards the substantive matter in the context of which the document was cited. Percentages are by weight, unless otherwise stated. Averages hereinbelow are weight averages, unless otherwise stated. Measured parameters hereinbelow were measured at a temperature of 25° C. and a pressure of 101.325 Pa, unless otherwise stated.

Polyurethane (PU) in the present invention is a product obtainable by reaction of isocyanates and polyols or compounds having isocyanate-reactive groups. In the course of the reaction to form the eponymous polyurethane, further functional groups can be formed, examples being allophanates, biurets, ureas or isocyanurates. Therefore, PU in the present invention comprehends polyisocyanurate as well as polyurethane. Polyurethane foam (PU foam) in the present invention is foam obtained as reaction product based on isocyanates and polyols or compounds having isocyanate-reactive groups. In the course of the reaction to form the eponymous polyurethane, further functional groups can be formed, examples being allophanates, biurets, ureas or isocyanurates. Therefore, PU foams in the present invention comprehends polyisocyanurate foams (PIR foams) as well as polyurethane foams (PUR foams). Rigid polyurethane foams are preferred polyurethane foams.

The use of a nitrogenous compound in the manufacture of polyurethanes in the manner of the present invention is characterized in that the compound conforms to formula (I)

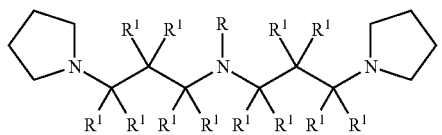

(I)

where

R in each occurrence is the same or different and represents hydrogen or an organic moiety of 1 to 60, preferably 1 to 30, carbon atoms with or without heteroatoms, for example oxygen, nitrogen and/or halogen atoms, $R^1$ in each occurrence is the same or different and represents hydrogen or an organic moiety of 1 to 30 carbon atoms with or without oxygen, nitrogen and/or halogen atoms, wherein the organic moiety is preferably a $C_1$-$C_{30}$ alkyl radical, preferably $R^1$ is hydrogen and more preferably every $R^1$ is hydrogen, or is a corresponding quaternized or protonated compound of formula (I).

Preferably, the formula (I) compound used conforms to formula (II) or is a corresponding quaternized or protonated compound

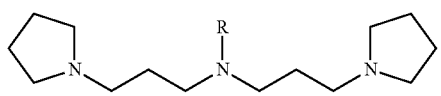

(II)

where R is as defined above.

The compounds of formula (I) can be quaternized using any reagent known as a quaternizing reagent. Preferred quaternizing agents are alkylating agents, for example dimethyl sulphate, methyl chloride or benzyl chloride, more preferably methylating agents such as dimethyl sulphate in particular. It is similarly possible to quaternize with alkylene oxides such as, for example, ethylene oxide, propylene oxide or butylene oxide, preferably with subsequent neutralization with organic or inorganic acids.

When R in the compounds of formula (I), preferably formula (II), or the corresponding quaternized or protonated compounds of formula (I) or (II), does not represent hydrogen, it preferably represents a radical of the formula

(VI)

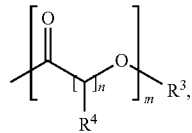

(VII)

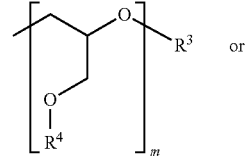

(VIII)

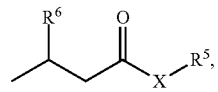

(IX)

where m=1 to 20 n=1 to 36 y in each occurrence is the same or different and represents 1 to 10, preferably 2 to 5, X represents O or NH, $R^2$ in each occurrence is the same or different and represents —H, —$CH_3$, —$CH_2CH_3$ or phenyl, preferably hydrogen, $R^3$ in each occurrence is the same or different and represents —H or alkyl, preferably $C_1$-$C_{40}$ alkyl, ester moieties, urethane moieties or amide moieties, preferably H or $C_1$- or $C_6$-$C_{30}$ alkyl, more preferably hydrogen, $R^4$ represents $C_1$-$C_{22}$ alkyl, aryl or alkylaryl, $R^5$ represents H, $C_1$-$C_{22}$ alkyl, aryl or alkylaryl with or without OH functions, $R^6$ represents H or a radical of formula (X):

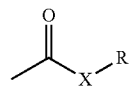

(X)

where $R^5$ and X are each as defined above. Preferably, R represents hydrogen or an organic moiety which is preferably reactive with regard to an isocyanate group, for example an R which bears one or more appropriate functionalities, for example an OH or amine function. More preferably, R is hydrogen or a radical of formula (VI).

It is particularly preferable for the compound of formula (I) to conform to formula (III)

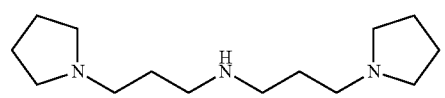

(III)

or to be a corresponding quaternized or protonated compound of formula (III). It is very particularly preferable for the compound of formula (I) to be an unquaternized and unprotonated compound of formula (III).

The compounds of formulae (I) to (III) can be in a mono- or polyquaternized state. Preferably, the compounds of formulae (I) to (III) are only monoquaternized. When monoquaternized, the compounds of formulae (I) to (III) are preferably quaternized at a nitrogen atom which is part of a ring.

It is particularly preferable for the compounds of formula (I) or the described preferred embodiments as per formula (II) or (III) to be used in an unquaternized state.

The compounds of compounds of formula (I) or the described preferred embodiments as per formula (II) or (III) can be converted into the corresponding protonated compounds by reaction with organic or inorganic acids. These protonated compounds may for example be preferable when for example a slowed polyurethane reaction is to be obtained.

Useful organic acids include, for example, carboxylic acids having 1 to 36 carbon atoms (aromatic or aliphatic, linear or branched) or else polymeric acids such as, for example, polyacrylic or polymethacrylic acids. Useful inorganic acids include, for example, phosphorus-based acids, sulphur-based acids or boron-based acids.

The compounds of formulae (I) to (III) are obtainable, for example, in accordance with the method described in WO 2012072441 (cyanoethylation and reduction to the amine) or as described in Katritzky et al. (J. Org. Chem. (1994), 59, 5206-5214) for the preparation of some bis[3-(1-pyrrolidinyl)propyl]amines. Compounds of formula (III) are known as bis[3-(1-pyrrolidinyl)propyl]amine having the CAS number [1281779-39-2] and can be purchased from Aurora Fine Chemicals (ID-Number: A02.124.463) for example.

It is particularly preferable for the compounds of formula (I) or the described preferred embodiments as per formula (II) or (III) to be used in an unprotonated state.

The compounds used according to the present invention are preferably obtainable using the hereinbelow described process, which comprises an addition reaction of acrylonitrile (or of a corresponding acrylonitrile substituted at the carbon atoms with $R^1$ radicals and/or at the nitrogen atom with R radicals) onto pyrrolidine and a reductive amination of the resultant intermediate. The addition reaction preferably takes the form of a Michael addition.

The addition in the process is preferably carried out in the presence of Brönstedt acid. The reductive amination can be carried out, for example, in the presence of metal catalysts, for example Raney cobalt.

To prepare compounds of formula (III) in the process, it is preferable to add acrylonitrile onto pyrrolidine and to reductively aminate the resultant intermediate to the bis(pyrrolidinopropyl)amine (compound of formula (III)). The reductive amination can by-produce a compound (N-aminopropylpyrrolidine) of formula (IV)

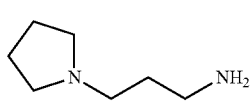

(IV)

The reaction scheme for preparing the compound of formula (III) is depicted in FIG. 1 by way of example.

A further possible by-product is a tris(pyrrolidinopropyl)amine of formula (V):

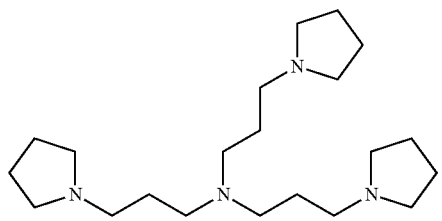

(V)

Moore et al. (J. Chem. Soc. Dalton Trans. (1987), 545-550) describe the preparation of some 3-(1-pyrrolidinyl)propylamine derivatives based on compounds of formula (IV). The synthetic route described therein involves the cyanoethylation of pyrrolidine and a subsequent reduction with sodium. U.S. Pat. No. 5,349,063 describes the preparation of compounds of formula (IV) by addition of acrylonitrile onto pyrrolidine and subsequent reduction with $LiAlH_4$.

When compounds of formula (I) or (II) are to be prepared with R other than H, it is necessary either to use an acrylonitrile substituted at the nitrogen atom with appropriate R radicals or to react the corresponding compound of formula (I) or (II) where R represents H with suitable reagents. To obtain compounds of formula (I) or (II) wherein R conforms to formula (VII), the reagents used can be, for example, hydroxy carboxylic acids or lactones, e.g. hydroxystearic acid, lactic acid, butyrolactone or valerolactone.

To obtain compounds of formula (I) or (II) where R conforms to formula (VI), the reagents used can be, for example, ethylene oxide, propylene oxide, butylene oxide or styrene oxide.

To obtain compounds of formula (I) or (II) wherein R conforms to formula (VIII), glycidol or glycidyl ethers can be used as reagents, for example.

To obtain compounds of formula (I) or (II) wherein R conforms to formula (IX), maleic acid derivatives, (meth)acrylic acid derivatives or acrylamide can be used as reagents, for example.

Preferably, the above-described compounds of formula (I) are used as a catalyst in the production of polyurethanes in the manner of the present invention. The compounds of formula (I) can be used therein to supplement customary catalysts or to replace customary catalysts. More particularly, the compounds of the present invention are used as a replacement for other amine catalysts.

In the production of polyurethanes or polyurethane systems in the manner of the present invention, it is preferable for at least a compound of the formula (I) according to the present invention, at least a polyol component and at least an isocyanate component to be reacted with one another in the optional presence of water, physical blowing agents, flame retardants, further catalysts and/or further additives.

The isocyanate components used are preferably one or more organic isocyanates having two or more isocyanate functions. The polyol components used are preferably one or more polyols having two or more isocyanate-reactive groups.

Isocyanates useful in this invention as isocyanate components include all polyfunctional organic isocyanates, for example 4,4'-diphenylmethane diisocyanate (MDI), toluene diisocyanate (TDI), hexamethylene diisocyanate (HMDI) and isophorone diisocyanate (IPDI). Of particular suitability are the crude MDI mixture of MDI and more highly condensed analogues having an average functionality of 2 to 4 and also the various isomers of TDI in pure form or as isomeric mixture. Examples of particularly suitable isocyanates are mentioned for example in EP 1 712 578, EP 1 161 474, WO 00/58383, US 2007/0072951, EP 1 678 232 and WO 2005/085310.

Polyols useful in the present invention as polyol component include all organic substances having two or more isocyanate-reactive groups, preferably OH groups, and also preparations thereof. Preferred polyols include all polyether and polyester polyols customarily used for producing polyurethane foams, or natural oil based polyols. Polyether polyols are obtainable by reacting polyfunctional alcohols or amines with alkylene oxides. Polyester polyols are based on esters of polybasic carboxylic acids (which can be either aliphatic, as in the case of adipic acid for example, or aromatic, as in the case of phthalic or terephthalic acid for example) with polyhydric alcohols (usually glycols).

Depending on the properties required of the resulting foams, corresponding polyols can be used, as described for example in: US 2007/0072951 A1, WO 2007/111828, US 2007/0238800, U.S. Pat. No. 6,359,022 or WO 96/12759. Polyols based on vegetable oil can also be used. Polyols of this type are described for example in WO 2006/094227, WO 2004/096882, US 2002/0103091, WO 2006/116456 and EP 1 678 232.

The ratio of isocyanate and polyol, expressed as the index of the formulation, i.e. as stoichiometric ratio of isocyanate groups to isocyanate-reactive groups (e.g. OH groups, NH groups), multiplied by 100, is preferably in the range from 10 to 1000 and more preferably in the range from 80 to 350.

Additional catalysts used can be catalysts for the isocyanate-polyol and/or isocyanate-water reactions and/or for the isocyanate trimerization.

Suitable additional catalysts for the purposes of the present invention, in addition to the compounds of the present invention, are substances which catalyse the gelling reaction (isocyanate-polyol), the blowing reaction (isocyanate-water) or the di- or trimerization of the isocyanate. Typical examples are the amines triethylamine, dimethylcyclohexylamine, tetramethylethylenediam ine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylam inopropyl)hexahydro-1,3,5-triazine, dimethylaminoethanol, dimethylaminoethoxy-ethanol and bis(dimethylaminoethyl) ether, and also metal-containing compounds such as, for example, tin compounds such as dibutyltin dilaurate or tin(II) 2-ethylhexanoate and potassium salts, such as potassium acetate and potassium 2-ethylhexanoate. Suitable catalysts are mentioned for example in DE 102007046860, EP 1985642, EP 1985644, EP 1977825, US 2008/0234402, EP 0656382 B1 and US 2007/0282026 and the patent documents cited therein.

The compounds of formulae (I) to (Ill) according to the present invention, or the corresponding protonated or quaternized compounds, can be used in pure form or in admixture with suitable solvents and adjuvants.

Useful solvents include any substances which are suitable according to the prior art. Preferred substances are satisfactorily processible in foaming and have no adverse effect on the properties of the foam. Isocyanate-reactive compounds are suitable, for instance, because they also react into the polymer matrix and do not generate emissions in the foam. Examples include OH-functional compounds such as (poly) alkylene glycols:ethylene glycol, diethylene glycol, propylene glycol, dipropylene glycol, and also higher homologues thereof.

Useful adjuvants include any prior art substances used in the manufacture of PU foam, for example antioxidants, flame retardants, biocides, dyes, pigments, antistats, further catalytically active substances or surfactants.

Suitable use levels of additional catalysts depend on the type of the catalyst and are preferably in the range from 0.05 to 5 pphp (=parts by weight per 100 parts by weight of polyol), or from 0.1 to 10 pphp in the case of potassium salts.

When polyurethane foams are to be produced as polyurethanes or polyurethane systems, it can be advantageous to use water as blowing agent. Sufficient water is preferably used for the water quantity to be 0.1 to 25 pphp.

Suitable physical blowing agents can also be used. Suitable physical blowing agents include, for example, liquefied $CO_2$, and volatile liquids, for example hydrocarbons having 3, 4 or 5 carbon atoms, preferably cyclopentane, isopentane and n-pentane, hydrofluorocarbons, preferably HFC 245fa, HFC 134a and HFC 365mfc, hydrochlorofluorocarbons, preferably HCFC 141b, hydrofluoroolefins (HFOs) or hydrohaloolefins such as, for example, 1234ze, 1233zd(E) or 1336mzz, oxygen-containing compounds such as methyl formate, acetone and dimethoxymethane, or hydrochlorocarbons, preferably dichloromethane and 1,2-dichloroethane.

In addition to water and the physical blowing agents, it is also possible to use other chemical blowing agents which react with isocyanates to evolve a gas, for example formic acid.

Suitable flame retardants for the purposes of this invention include any substances which the prior art regards as suitable for this purpose. Preferred flame retardants are liquid organophosphorus compounds, such as halogen-free organic phosphates, e.g. triethyl phosphate (TEP), halogenated phosphates, e.g. tris(1-chloro-2-propyl) phosphate (TCPP) and tris(2-chloroethyl)phosphate (TCEP) and organic phosphonates, e.g. dimethyl methanephosphonate (DMMP), dimethyl propanephosphonate (DMPP), or solids such as ammonium polyphosphate (APP) and red phosphorus. Useful flame retardants further include halogenated compounds, for example halogenated polyols, and also solids such as melamine and expandable graphite.

To influence the foam properties of polyurethane foams, additives can be used in the production thereof, and these additives can be more particularly siloxanes or to be more precise organomodified siloxanes, in which case the substances referred to in the prior art can be used. Preferably, the compounds used of this type are particularly suitable for the particular foam types (rigid foams, hot-cure flexible foams, viscoelastic foams, ester foams, HR foams, semi-rigid foams). Suitable (organomodified) siloxanes are described for example in the following documents: EP 0839852, EP 1544235, DE 10 2004 001 408, EP 0839852, WO 2005/118668, US 20070072951, DE 2533074, EP 1537159, EP 533202, U.S. Pat. No. 3,933,695, EP 0780414, DE 4239054, DE 4229402, EP 867465. These compounds can be prepared as described in the prior art. Suitable examples are for instance described in U.S. Pat. No. 4,147, 847, EP 0493836 and U.S. Pat. No. 4,855,379.

Any stabilizers known from the prior art can be used as (foam) stabilizers. Preference is given to using foam stabilizers based on polydialkylsiloxane-polyoxyalkylene copolymers as commonly/generally used in the production of urethane foams. The construction of these compounds is preferably such that, for example, a long-chain copolymer of ethylene oxide and propylene oxide is connected to a polydimethylsiloxane moiety. The link between the polydialkylsiloxane and the polyether portion can take the form of an SiC link or an Si—O—C bond. Structurally, the polyether or the different polyethers can be bonded terminally or laterally to the polydialkylsiloxane. The alkyl radical or the various alkyl radicals involved may be aliphatic, cycloaliphatic or aromatic. Methyl groups are very particularly advantageous here. The polydialkylsiloxane may be linear or else contain branching. Suitable stabilizers, especially foam stabilizers, are described inter alia in U.S. Pat. No. 2,834,748, U.S. Pat. No. 2,917,480 and U.S. Pat. No. 3,629,308. Suitable stabilizers are available from Evonik Industries AG under the trade name of TEGOSTAB®.

The compounds of the present invention are preferably used in the manufacture of polyurethane systems, especially polyurethane foams.

It may be advantageous when the process of manufacturing the polyurethane or the polyurethane system comprises preparing and/or using a composition comprising at least a compound according to the present invention, at least a polyol component, if appropriate at least an isocyanate component and also optionally one or more blowing agents, and reacting this composition. Particular preference is given to the use of such compositions as include the chemistries/components for producing polyurethanes or polyurethane systems which were described above in relation to the use according to the present invention.

The present compositions containing at least one polyol component are characterized in that they include at least a compound of formula (I), (II) or (III), as described above, or a corresponding quaternized or protonated compound. Preferably, the composition of the present invention further includes at least one isocyanate component. More preferably, the composition includes from 0.01 to 5 wt %, preferably from 0.1 to 1 wt %, of compounds of formulae (IV) and/or (V) based on the sum total of compounds of formulae (I) to (V).

The molar ratio of compounds of formula (I), (II) or (III) or of the corresponding quaternized compounds to isocyanate-reactive groups of the polyol component is preferably in the range from $4 \times 10^{-4}$:1 to 0.2:1.

The composition of the present invention may additionally include one or more blowing agents, as described above. In addition to or in place of blowing agents, the composition of the present invention may include further adjuvants/auxiliaries or additives used in the manufacture of polyurethane systems, preferably polyurethane foams. A selection of suitable auxiliaries/adjuvants/additives, e.g. foam stabilizers or flame retardants, were already described above in relation to the manufacture of polyurethanes.

The compositions of the present invention can be processed into polyurethane systems, especially PU foams, by any method known to a person skilled in the art, for example by hand mixing or preferably by using foaming machines, especially low-pressure or high-pressure foaming machines. The processes used can be batch processes, for example to manufacture moulded foams, refrigerators or panels, or continuous processes, for example for insulation sheets, metal composite elements, slabstock or for spraying.

Any conventional process for producing PU foams, especially flexible polyurethane foams, can be used. For instance, the foaming can be performed both horizontally and vertically in batch or continuous equipment. Similarly, the compositions used according to the present invention can be used for $CO_2$ technology. The use in low-pressure and high-pressure machines is possible in that the compositions can be metered directly into the mixing chamber or else be admixed upstream of the mixing chamber to a component which subsequently is fed into the mixing chamber. Admixture can also take place in the raw-material tank.

Using compounds of formula (I) in the manner of the present invention provides the hereinbelow described polyurethane systems of the present invention.

These polyurethane systems of the present invention are preferably polyurethane foams, more preferably rigid polyurethane foams, flexible polyurethane foams, viscoelastic foams, high-resilience foams, semi-rigid polyurethane foams, thermoformable polyurethane foams or integral foams. The term polyurethane herein is to be understood as a generic term for any polymer obtained from di- or polyisocyanates and polyols or other isocyanate-reactive species, such as amines for example, in that the urethane bond need not be the only or predominant type of bond. Polyisocyanurates and polyureas are also expressly included.

The polyurethane foams of the present invention are preferably characterized in that they include a 0.005 to 10 wt %, more preferably 0.05 to 3 wt % and even more preferably 0.1 to 1 wt %, mass fraction of compounds of formula (I), or of moieties obtained by conversion thereof, based on the final polyurethane foam.

In one preferred embodiment, the PU foams according to the present invention or obtained according to the present invention are open-cell flexible PU foams. Open-cell is to be understood in the context of the present invention as meaning that the air permeability of the foam in question is good. The air permeability of the foam can be determined by performing a dynamic-pressure measurement on the foam. The dynamic-pressure measurement can be carried out in accordance with EN 29053. When the measured dynamic pressure is reported in mm of ethanol, open-cell PU foams, especially flexible PU foams, have a dynamic pressure of below 100 mm, preferably 50 mm of ethanol column, as determined by the method of measurement described in the examples.

A preferred composition for producing polyurethane/polyisocyanurate foam within the meaning of the present invention would produce a density of 20 to 90 kg/m³ and have the following composition:

| Component | Weight fraction |
|---|---|
| polyol | 100 |
| (amine) catalyst | 0.05 to 5 |
| potassium trimerization catalyst | 0 to 10 |
| siloxane | 0.1 to 15, preferably 0.2 to 7 |
| water | 0 to <25, preferably 0.1 to 15 |
| blowing agent | 0 to 130 |
| flame retardant | 0 to 70 |
| filler | 0 to 150 |
| further additives | 0 to 20 |
| isocyanate index: | above 15 |

The present invention is more particularly elucidated with reference to FIG. 1 without the invention being supposedly restricted to the embodiments indicated therein.

The process of the present invention is more particularly elucidated with reference to the reaction scheme for producing compounds of formula (III) and optionally (IV) which is depicted in the illustration of FIG. 1 without being restricted to the depicted reaction scheme. In the reaction scheme, the reaction step of the addition reaction is labelled A and the reaction step of the reductive amination is labelled B.

The examples recited hereinbelow describe the present invention by way of example without the invention, the scope of which is apparent from the entire description and the claims, being supposedly restricted to the embodiments referred to in the examples.

EXAMPLES

Example 1

Production of Rigid Foams

The foaming tests were carried out by hand mixing. Formulations as reported in Table 1 were used. Polyol, conventional/inventive catalyst, water, foam stabilizer and blowing agent were weighed into a beaker and mixed with a plate stirrer (6 cm in diameter) at 1000 rpm for 30 s. The amount of blowing agent which had evaporated in the course of mixing was determined by reweighing and replenished. Then, the isocyanate (MDI) was added, the reaction mixture was stirred at 3000 rpm for 5 s with the stirrer described and immediately transferred into a paper-lined box. To evaluate the catalytic properties, the following characteristic parameters were determined: cream time, gel time, full-rise time and tackfree time.

TABLE 1

Formulation for producing rigid foam

| Component | Weight fraction |
| --- | --- |
| Daltolac R 471* | 100 parts |
| water | 2.6 parts |
| cyclopentane | 13.1 parts |
| TEGOSTAB ® B 8460 | 1.5 parts |
| catalyst | 1.5 parts |
| Desmodur 44V20L** | 198.5 parts |

*polyether polyol from Huntsman
**polymeric MDI from Bayer; 200 mPa*s; 31.5% NCO; functionality 2.7.

The results of evaluating the catalytic properties of the two catalysts being compared—Tegoamin DMCHA (prior art) and compound of formula (III) used according to the present invention—are reported in Table 2.

TABLE 2

Reaction time results in seconds-comparison of inventive amine structures with N,N-dimethylcyclohexylamine (DMCHA)

| | Cream time | Gel time | Full-rise time | Tackfree time |
| --- | --- | --- | --- | --- |
| TEGOAMIN ® DMCHA | 37 | 137 | 197 | 272 |
| FORMULA III | 47 | 222 | 307 | 417 |

As is discernible from Table 2, the amine of formula (III) develops sufficient activity in rigid foam and exhibits a careful balance between the gelling reaction and the blowing reaction. The foam catalysed using the compound of formula (III) exhibits no disadvantages with regard to its physical properties compared with the TEGOAMIN® DMCHA-catalysed foam.

Performance Tests

Physical Properties of Flexible Polyurethane Foams

The flexible polyurethane foams obtained were evaluated on the basis of the following physical properties:

a) Foam settling at the end of the rise phase. Settling or conversely post-rise is obtained from the difference in the foam height after direct blow-off and after 3 min after blow-off of the foam. Foam height here is measured using a needle secured to a centimeter scale, on the peak in the middle of the foam top surface. A negative value here describes the settling of the foam after the blow-off, while a positive value correspondingly describes the post-rise of the foam.

b) Density; determined as described in ASTM D 3574-08 under Test A by measuring the core density.

c) The air permeability of the foam was determined by a dynamic-pressure measurement on the foam. The measured dynamic pressure is reported in mm of ethanol column, with lower dynamic-pressure values characterizing a more open foam. The values were measured in the range from 0 to 300 mm.

The dynamic pressure was measured using an apparatus comprising a nitrogen source, a reducing valve with manometer, a screw-thread flow regulator, a wash bottle, a flow meter, a T-piece, an applicator nozzle and a scaled glass tube, containing ethanol. The applicator nozzle has an edge length of 100×100 mm, a weight of 800 g, a clear width of 5 mm for the outlet hole, a clear width of 20 mm for the lower applicator ring and an outer diameter of 30 mm for the lower applicator ring.

The measurement is carried out by using the reducing valve to adjust the ingoing nitrogen pressure to 1 bar and using the screw-thread flow regulator to adjust the flow rate to 480 l/h. The ethanol quantity in the scaled glass tube is adjusted so that no pressure difference arises and can be read off. To perform the actual measurement on the test specimen, having dimensions of 250×250×50 mm, the applicator nozzle is superposed flush with the edges at the corners of the test specimen and also once at the (estimated) centre of the test specimen (on that side in each case which has the largest surface area). The dynamic pressure is read off once a constant dynamic pressure has been achieved.

The five measured values obtained are averaged.

d) Compression load deflection CLD, 40% to DIN EN ISO 3386-1.

Measurement of Emissions (the VOC Content) by the Daimler-Chrysler Test Method

Emission was determined using the Daimler-Chrysler test method PB VWT 709. The procedure for performing thermal desorption with subsequent coupled gas chromatography/mass spectrometry (GC/MS) is described below.

a) Measurement technique: Thermal desorption was performed using a "TDS2" thermal desorber with sample changer from Gerstel, Mülheim, combined with a Hewlett Packard HP6890/HP5973 GC/MSD system.

b) Measurement conditions are reported in Tables 3 and 4.

TABLE 3

Thermal desorption measurement parameters

| | |
| --- | --- |
| thermal desorption | Gerstel TDS2 |
| desorption temperature | 90° C. |
| desorption time | 30 min |
| flow | 60 ml/min |
| transfer line | 280° C. |
| cryofocusing | HP 6890 PTV |
| liner | glass vaporizer tube with silanized glass wool |
| temperature | −150° C. |

TABLE 4

| Gas chromatography/mass spectrometry measurement parameters | |
|---|---|
| GC | capillary GC HP 6890 |
| injector | PTV Split 1:50 |
| temperature programme | −150° C.; 3 min; ♂ 12° C./s; 280° C. |
| column | Agilent 19091B-115, Ultra 2, 50 m * 0.32 mm dF 0.5 μm |
| flow | 1 ml/min const. |
| temperature programme | 50° C.; 5 min; ♂ 3° C./min; 92° C.; ♂ 5° C./min; 160° C.; ♂ 10° C./min; 280° C., 20 min |
| detector | HP MSD 5973 |
| mode | scan 29-350 amu 2.3 scans/sec |
| evaluation | evaluation of total ion current chromatogram via calculation as toluene equivalent | c) Calibration

For calibration, 1 μl of a mixture of toluene and hexadecane in pentane (each 0.6 mg/ml) was introduced into a cleaned adsorption tube packed with Tenax®TA (mesh 35/60) and measured (desorption 5 min; 280° C.).

d) Sample preparation 10 mg of foam in three part samples were introduced into a thermal desorption tube. Care was taken to ensure that the foam is not compressed.

Determination of Room Temperature Emission by the so-Called Test Chamber Test:

The room temperature emission from the foams obtained was determined in accordance with the DIN method DIN 13419-1. Sampling took place after 24 hours. For this, 2 liters of the test chamber atmosphere were passed at a flow rate of 100 ml/min through an adsorption tube packed with Tenax®TA (mesh 35/60). The procedure of thermal desorption with subsequent coupled gas chromatography/mass spectrometry (GC/MS) is described below.

Tenax®TA is a porous polymeric resin based on 2,6-diphenylene oxide and is obtainable for example from Scientific Instrument Services, 1027 Old York Rd., Ringoes, N.J. 08551.

Measurement Technique

Thermal desorption was performed using a "TDS2" thermal desorber with sample changer from Gerstel, Mülheim, combined with a Hewlett Packard HP6890/HP5973 GC/MSD system.

Measurement conditions are reported in Tables 5 and 6.

TABLE 5

| Thermal desorption measurement parameters | |
|---|---|
| thermal desorption | Gerstel TDS2 |
| desorption temperature | 280° C. |
| desorption time | 5 min |
| flow | 60 ml/min |
| transfer line | 280° C. |
| cryofocusing | HP 6890 PTV |
| liner | glass vaporizer tube with silanized glass wool |
| temperature | −150° C. |

TABLE 6

| Gas chromatography/mass spectrometry measurement parameters | |
|---|---|
| GC | capillary GC HP 6890 |
| temperature programme | −150° C.; 3 min; ♂ 12° C./s; 280° C. |
| column | Agilent 19091B-115, Ultra 2, 50 m * 0.32 mm dF 0.5 μm |

TABLE 6-continued

| Gas chromatography/mass spectrometry measurement parameters | |
|---|---|
| flow | 1 ml/min const. |
| temperature programme | 50° C.; 5 min; ♂ 3° C./min; 92° C.; ♂ 5° C./min; 160° C.; ♂ 10° C./min; 280° C., 20 min |
| detector | HP MSD 5973 |
| evaluation | evaluation of total ion current chromatogram via calculation as toluene equivalent |

For calibration, 1 μl of a mixture of toluene and hexadecane in pentane (each 0.6 mg/ml) was introduced into a cleaned adsorption tube packed with Tenax®TA (mesh 35/60) and measured (desorption 5 min; 280° C.).

Example 2

Production of Flexible Polyurethane Foams

Foaming was done using 300 g of polyol; the other constituents of the formulation were appropriately converted arithmetically in that, for example, 1.0 part of a component is to be understood as meaning 1 g thereof per 100 g of polyol.

Foaming was initiated by mixing the polyol, water, amine, tin salt and silicone stabilizer thoroughly under agitation. The isocyanate was added and the mixture was stirred at 3000 rpm for 7 seconds and poured into a paper-lined wooden box (base area 27 cm×27 cm). The foamed material produced was subjected to the performance tests described hereinbelow.

The behaviour of various amines was mutually compared in a recipe based on 3.0 parts of water. The full-rise time profiles of the foams were recorded to be able to compare the catalytic activity. The emission values of the foams were also compared. The following amines were compared against each other: triethylenediamine, 33 wt % solution in dipropylene glycol (TEGOAMIN® 33, obtainable from Evonik Industries), bis(2-dimethylaminoethyl ether), 70 wt % solution in dipropylene glycol (TEGOAMIN® BDE, obtainable from Evonik Industries), N-(3-dimethylaminopropyl)-N,N-diisopropylamine (TEGOAMIN® ZE-1, obtainable from Evonik Industries) and the compound of formula (III). The recipe is reported in Table 7.

TABLE 7

| Recipe used in Example 2 | |
|---|---|
| | Recipe |
| 100 | parts of polyol*[1] |
| 3.0 | parts of water |
| 0.6 | part of TEGOSTAB® B 8110 foam stabilizer *[2] |
| 0.15 | part of catalyst*[3] |
| 0.15 | part of amine |
| 40.1 | parts of isocyanate (tolylene diisocyanate T80: 80% 2,4-isomer, 20% 2,6-isomer) |

*[1] = polyether triol of OH number 48.
*[2] = TEGOSTAB® products, obtainable from Evonik Industries, are polysiloxane-polyoxyalkylene block copolymers for use as foam stabilizer in the production of flexible slabstock and moulded polyurethane foams.
*[3] = KOSMOS® 29, obtainable from Evonik Industries, is the tin(II) salt of 2-ethylhexanoic acid.

Foaming results are reported in Table 8.

TABLE 8

Foaming results of Example 2

| Amine (0.15 part) | Full-rise time (in s) | Density (in kg/m³) | Porosity (open-cell content)* | Compression load deflection CLD40 compression (in kPa) | Settling (in cm) |
|---|---|---|---|---|---|
| TEGOAMIN ® 33 | 150 | 31.2 | 23 | 4.0 | 0.4 |
| TEGOAMIN ® BDE | 121 | 30.4 | 11 | 3.4 | 0.3 |
| TEGOAMIN ® ZE-1 | 168 | 31.2 | 29 | 3.2 | 0.0 |
| compound of formula (III) | 152 | 31.7 | 34 | 4.1 | 0.3 |

* = (dynamic pressure in mm of ethanol column)

One unambiguous finding is that the full-rise time of the compound of formula (III) corresponds to that of TEGOAMIN® 33. The amine in question accordingly locates in in terms of reactivity between a purely blowing catalyst such as TEGOAMIN® BDE and a stronger, reactive gelling catalyst such as TEGOAMIN® ZE-1.

Example 3

Foaming Results—Emissions

To investigate the influence of amines on foam emissions, a recipe containing a low-emission polyol was selected. Total emissions were measured as well as amine emissions. The recipe used is reported in Table 9.

TABLE 9

Recipe used in Example 3
Recipe

| 100 | parts of polyol*⁴ |
| 3.0 | parts of water |
| 0.8 | part of foam stabilizer*² (TEGOSTAB ® B 8228*²) |
| 0.2 | catalyst*³ (KOSMOS ® 29*³) |
| 0.25 | amine |
| 39.6 | parts of isocyanate (tolylene diisocyanate T80) (80% 2,4-isomer, 20% 2,6-isomer) |

*² = TEGOSTAB ® products, obtainable from Evonik Industries, are polysiloxane-polyoxyalkylene block copolymers for use as foam stabilizer in the production of flexible slabstock and moulded polyurethane foams.
*³ = KOSMOS ® 29, obtainable from Evonik Industries, is the tin(II) salt of 2-ethylhexanoic acid.
*⁴ = low-emission polyether triol of OH number 56

The emission characteristics of the foams described above were investigated in conformity with Daimler-Chrysler test method BP VWT 709 VOC determination (30 min at 90° C.). The results are reported in Table 10.

TABLE 10

Results regarding Example 3

| | VOC content | | |
|---|---|---|---|
| Amine catalyst | VOC (total) | VOC (amine) | Test chamber |
| TEGOAMIN ® 33 | 800 µg/g | 224 µg/g | 110 µg/m³ |
| TEGOAMIN ® BDE | 980 µg/g | 466 µg/g | 325 µg/m³ |
| TEGOAMIN ® ZE-1 | 420 µg/g | not detectable | 20 µg/m³ |
| compound of formula (III) | 240 µg/g | not detectable | <20 µg/m³ |

Table 10 unambiguously reveals that total emissions can be dramatically reduced by using the compound of formula (III) not just in comparison with unreactive amines such as TEGOAMIN® BDE or TEGOAMIN® 33, but also with already VOC-optimized amines such as TEGOAMIN® ZE-1. In addition, use of compounds of formula (III) shortens the full-rise times versus ZE-1.

Example 4

HR Foam (Block/Moulded)

The same foaming methods were used here as with the conventional flexible polyurethane foam in Example 2.

500 g of polyol were used; the other constituents of the formulation were appropriately converted arithmetically in that, for example, 1.0 part of a component is to be understood as meaning 1 g thereof per 100 g of polyol.

Foaming was initiated by mixing the polyol, water, amine and silicone stabilizer thoroughly under agitation. The isocyanate was added and the mixture was stirred at 3000 rpm for 4 seconds and poured into a paper-lined wooden box (base area 27 cm×27 cm). The foamed material produced was subjected to the performance tests described hereinbelow.

The behaviour of various amines was mutually compared in a recipe as reported in Table 11. The full-rise times of the foams were determined to be able to compare the catalytic activity. The emission values of the foams were also compared. The following amines were compared against each other: triethylenediamine, 33 wt % solution in dipropylene glycol (TEGOAMIN® 33, available from Evonik Industries), Jeffcat® Z-130 (1,3-propanediamine, N-(3-(dimethylamino)propyl)-N,N-dimethyl,) available from Huntsman) and the compound of formula (III).

TABLE 11

Recipe used in Example 4
Recipe

| 70 | parts of polyol 1 |
| 30 | parts of polyol 2 |
| 3.7 | parts of water |
| 1.0 | part of TEGOSTAB ® B 8727 LF 2 foam stabilizer *² |
| 0.5 | part of glycerol |
| 1.0 | part of diethanolamine |
| 0.33 | part of amine |
| 44 | parts of isocyanate (tolylene diisocyanate T80: 80% 2,4-isomer, 20% 2,6-isomer) | polyol 1 = polyether triol of OH number 32
Polyol 2 = polyether triol of OH number 20, containing 43% solids (SAN).
*² = TEGOSTAB ® products available from Evonik Industries Foaming results are shown in Table 12.

TABLE 12

Foaming results from Example 4

| Amine (0.33 part) | Full-rise time (in s) | Gel time (in s) | Cell count (in cm⁻¹) | Foam height (in cm) | Settling (in cm) |
|---|---|---|---|---|---|
| TEGOAMIN ® 33 | 127 | 79 | 10 | 32.5 | 0.7 |
| Jeffcat Z-130 | 169 | 100 | 10 | 31.7 | 0.9 |
| compound of formula (III) | 160 | 95 | 10 | 32.2 | 0.2 |

The emissions of the foams were likewise determined in accordance with Daimler-Chrysler test method BP VWT 709. The results are reported in Table 13.

TABLE 13

Results regarding Example 4

| Amine catalyst | VOC content | |
| --- | --- | --- |
| | VOC (total) | VOC (amine) |
| TEGOAMIN ® 33 | 810 μg/g | 210 μg/g |
| Jeffcat ® Z-130 | 320 μg/g | not detectable |
| compound of formula (III) | 210 μg/g | not detectable |

Table 13 unambiguously reveals that total emissions can be reduced by using the compound of formula (III) not just in comparison with unreactive amines such as TEGOAMIN® 33, but also with already VOC-optimized amines such as Jeffcat® Z-130. In addition, use of compounds of formula (III) shortens the full-rise times versus Jeffcat® Z-130.

The invention claimed is:

1. A method of producing polyurethane, said method comprising:
reacting at least one polyol component and at least one isocyanate component in the presence of a nitrogenous compound, said nitrogenous compound is a compound of formula (I)

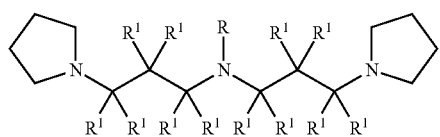

(I)

wherein
R is hydrogen or an organic moiety of 1 to 60 carbon atoms with or without heteroatoms,
$R^1$ in each occurrence is the same or different and is hydrogen or an organic moiety of 1 to 30 carbon atoms with or without oxygen, nitrogen and/or halogen atoms, or is a corresponding quaternized or protonated compound.

2. The method according to claim 1, wherein said nitrogenous compound of formula (I) is a compound of formula (II)

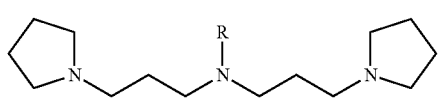

(II)

wherein R is as defined in claim 1, or is a corresponding quaternized or protonated compound.

3. The method according to claim 1, wherein R is one of

  (VI)

$-(CH_2-CHR^2-O)_y-R^3$,

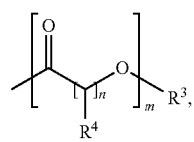  (VII)

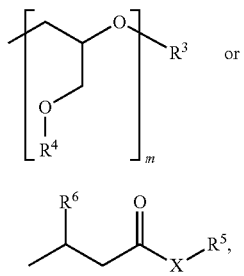  (VIII) or

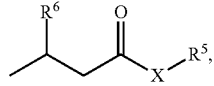  (IX)

wherein
m=1 to 20
n=1 to 36
y in each occurrence is the same or different and is 1 to 10, X represents O or NH,
$R^2$ in each occurrence is the same or different and is —H, —$CH_3$, —$CH_2CH_3$ or phenyl,
$R^3$ in each occurrence is the same or different and is —H, alkyl, ester moieties, urethane moieties or amide moieties,
$R^4$ is $C_1$-$C_{22}$ alkyl, aryl or alkylaryl,
$R^5$ is H, $C_1$-$C_{22}$ alkyl, aryl or alkylaryl with or without OH functions,
$R^6$ is H or a radical of formula (X):

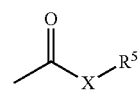  (X)

wherein
$R^5$ and X are each as defined above.

4. The method according to claim 1, wherein said nitrogenous compound of formula (I) is a compound of formula (III)

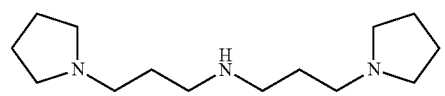  (III)

or is a corresponding quaternized or protonated compound.

5. The method according to claim 1, wherein R is an organic moiety which is reactive with regard to an isocyanate group.

6. The method according to claim 1 wherein said nitrogenous compound catalyzes the reaction of said at least polyol component and said at least one isocyanate component.

7. The method according to claim 1, wherein reacting provides a polyurethane foam.

8. The method according to claim 1, wherein a composition of said nitrogenous compound of formula (I), said at least one polyol component, and said at least one isocyanate component is prepared prior to said reacting.

9. A polyurethane system obtained by the method of claim 1.

10. The polyurethane system according to claim 9, wherein said polyurethane system is a rigid polyurethane foam, a flexible polyurethane foam, a viscoelastic foam, a high-resilience foam, a semi-rigid polyurethane foam, a thermoformable polyurethane foam or an integral foam.

11. The polyurethane system according to claim 9, wherein from 0.005 to 10 wt % mass fraction of said nitrogenous compound of formula (I), or of moieties obtained by conversion thereof, is present in a polyurethane foam.

12. A composition comprising:
    at least one polyol component, and at least one nitrogenous compound, said at least one nitrogenous compound is a compound of formula (I)

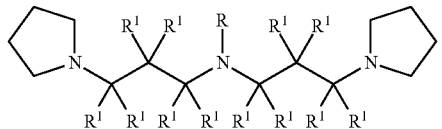

(I)

wherein
R in each occurrence is the same or different and is hydrogen or an organic moiety of 1 to 60 carbon atoms with or without heteroatoms,
$R^1$ in each occurrence is the same or different and is hydrogen or an organic moiety of 1 to 30 carbon atoms with or without oxygen, nitrogen and/or halogen atoms,
or is a corresponding quaternized or protonated compound.

13. The composition according to claim 12, further comprising at least one isocyanate component.

14. The composition according to claim 12, wherein a molar ratio of said at least one nitrogenous compound to isocyanate-reactive groups of said polyol component is in a range from $4\times10^{-4}$:1 to 0.2:1.

15. The composition according to claim 12, further comprising one or more blowing agents.

16. A polyurethane foam comprising from 0.005 to 10 wt % mass fraction base on the entire polyurethane foam of a nitrogenous compound, said nitrogenous compound is a compound of formula (I)

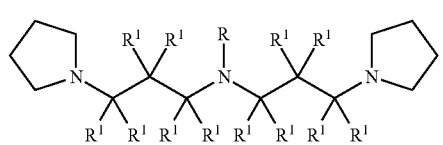

(I)

wherein
R in each occurrence is the same or different and is hydrogen or an organic moiety of 1 to 60 carbon atoms with or without heteroatoms,
$R^1$ in each occurrence is the same or different and is hydrogen or an organic moiety of 1 to 30 carbon atoms with or without oxygen, nitrogen and/or halogen atoms,
or is a corresponding quaternized or protonated compound.

* * * * *